July 15, 1952
J. M. DAILY
2,603,597
METHOD AND APPARATUS FOR LIQUID TREATMENT
Filed Nov. 6, 1946
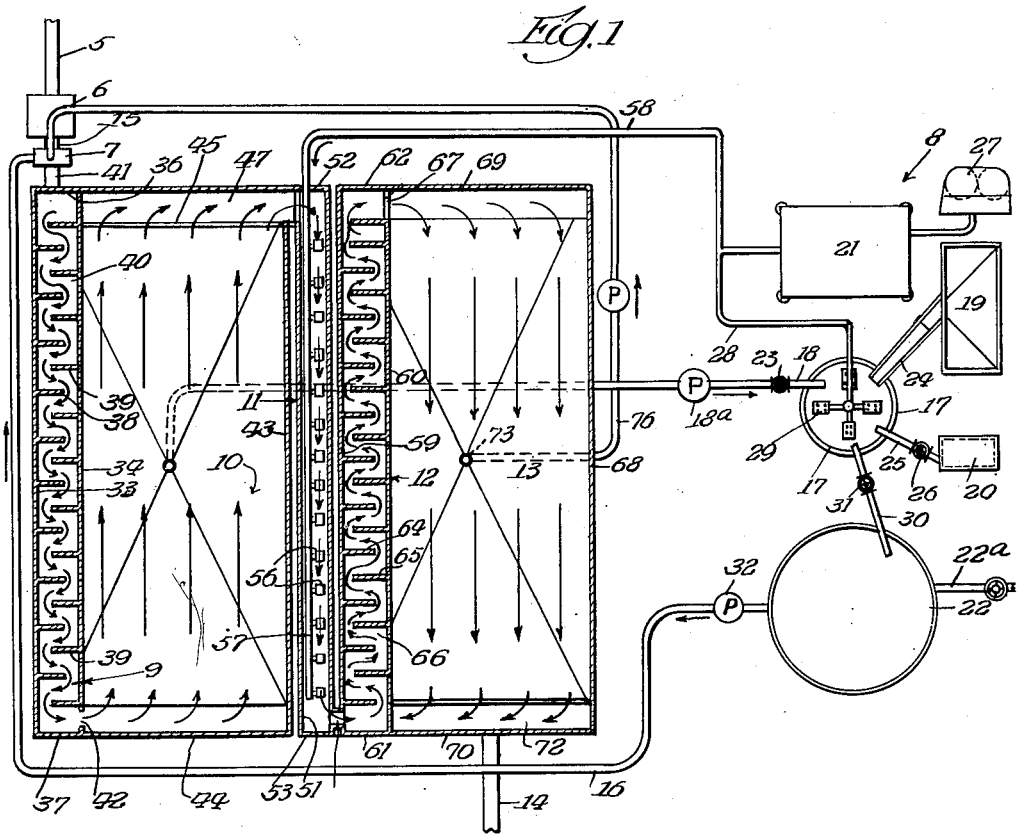
Inventor
James M. Daily
By: Thed Gerlach atty Patented July 15, 1952

2,603,597

UNITED STATES PATENT OFFICE 2,603,597

METHOD AND APPARATUS FOR LIQUID TREATMENT

James M. Daily, Wilmette, Ill., assignor to American Ozone Company, Chicago, Ill.

Application November 6, 1946, Serial No. 708,201

14 Claims. (Cl. 210—2)

The present invention relates generally to the treatment, clarification and purification of polluted liquids with particles suspended therein, such, for example, as sewage and industrial waste. More particularly the invention relates to that type of liquid treatment, clarification and purification which involves the use of ozonous and electrified air.

One object of the invention is to provide an apparatus for, and a method of, treating, clarifying and purifying polluted liquids of the aforementioned character, which are an improvement upon, and have certain inherent advantages over, the apparatus and method of United States Letters Patent No. 2,320,512, granted to me on June 1, 1943, and are characterized by extremely high efficiency and the fact that they are capable of producing extremely satisfactory results at a comparatively low cost and with but a comparatively small amount of equipment.

Another object of the invention is to provide an apparatus and method of the last mentioned character which involve as a coagulating and flocculating medium for the suspended particles in the liquid being treated, an ozonated and acidified solution of ferrous sulfate or like metallic salts capable of coagulating and flocculating aqueous suspended particles, either alone or in combination with part of the recovered sludge or other suspended matter.

A further object of the invention is to provide an apparatus and method of the aforementioned type and character which contemplate and involve, as successive operating steps, first mixing with the liquid to be treated the coagulating and flocculating medium, then removing from the liquid the coagulated and flocculated substances, then subjecting the liquid to treatment by ozonous and electrified air in order to reactivate through oxidation the residual dissolved coagulating and flocculating medium and thus effect further or additional coagulation and flocculation of substantially all remaining suspended particles in the liquid, and then removing from the liquid the coagulated and flocculated substances resulting from such treatment of the liquid by ozonous and electrified air.

A still further object of the invention is to provide an apparatus for, and method of, treating, clarifying and purifying polluted liquids, which are generally an improvement in the art and are characterized by simplicity as well as high efficiency.

Other objects of the invention and the various advantages and characteristics of the present apparatus and method will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a diagrammatic or schematic plan view of an apparatus embodying the invention; and Figure 2 is a vertical longitudinal section of the apparatus.

The apparatus which is shown in the drawing constitutes a part of the present invention and the use thereof involves the method constituting another part of the invention. So far as the method is concerned it may, however, be carried out in an apparatus other than that herein disclosed and illustrated. The apparatus is essentially for the purpose of treating, clarifying and purifying a polluted liquid having suspended particles therein, such, for example, as sewage or industrial waste. For convenience in this specification the liquid to be treated will be referred to as "sewage" and the solid matter which is removed from the sewage will be referred to as "sludge." Likewise, the coagulating and flocculating metallic salt which comprises one of the materials forming the flocculating and coagulating medium will, for convenience, be referred to as "ferrous sulphate." None of such references is to be taken as limiting the generality of the description of the process or of the means by which the result is accomplished. As hereinafter described in detail, the sewage is treated in the apparatus while it is in a constantly moving or flowing body. In general the apparatus comprises an influent duct 5 for the raw sewage, a unit 6 for ridding the raw sewage of any and all floating substances and large objects, a mixing chamber 7, a unit 8 for supplying the mixing chamber with a coagulating and flocculating medium, a first flocculator 9, a settling basin 10, an ozonating tower 11, a second flocculator 12, a second settling basin 13 and an effluent duct 14.

The influent duct 5 has the inlet end thereof connected to the source of raw sewage to be treated and serves to supply the sewage in the form of a constantly moving or flowing body to the unit 6.

Such unit 6 is connected to the discharge end of the influent duct 5 and comprises a screening, grinding or comminuting arrangement (not shown), or a combination thereof, and serves to remove or disintegrate any and all large sized substances and objects in the sewage. Any suitable conventional unit may be employed in the apparatus for the purpose of ridding the raw sewage of large sized objects therein.

The mixing chamber 7 is connected to the discharge end of the unit 6 by way of a duct 15 and receives the coagulating and flocculating medium from the unit 8 by way of a pipe 16. It is so arranged and designed that the coagulating and flocculating medium is intimately mixed with the raw sewage preparatory to the sewage entering and flowing through the first flocculator 9. It is contemplated that the coagulating and flocculating medium from the unit 8 will be introduced into the mixing chamber 7 in the form of a steady stream and at a rate that is determined by measurements based on records of the character of the sewage that is to be treated.

The unit 8 serves to produce and supply the coagulating and flocculating medium which, as heretofore indicated, is in the form of ozonated and acidified ferrous sulphate or like metallic salt either alone or in combination with a part of the removed sludge. As its principal components or parts the unit 8 comprises an ozonating tank 17, a pipe 18 for delivering the recovered sludge from the bottom of the settling basin 10 into the ozonating tank, a hopper 19 for supplying the ozonating tank 17 with ferrous sulphate either in solution or in dry form, a reservoir 20 for supplying sulphuric or other acid into the ozonating tank, an ozone generator 21 for introducing ozone or ozonous and electrified air into the tank 17, and a tank 22 for storing the coagulating and flocculating medium that is prepared in said ozonating tank 17. The tank 17 may contain baffles (not shown) to act upon the flow of the various materials through the tank, in order to increase the effectiveness of the ozonation. The ozonating tank 17 has an open top and is formed of concrete or other material that is not subject to oxidation. The pipe 18 includes a motor driven pump 18a and a valve 23. When the valve is open while the pump is in operation sludge in wet form is pumped from the bottom of the first settling basin 10 through the pipe 18 and into the ozonating tank 17. The hopper 19 is preferably located above the ozonating tank 17 and is adapted to contain a supply of ferrous sulphate in either solution or dry crystal form. It embodies a discharge channel 24 and this leads to, and communicates with, the upper portion of the interior of the ozonating tank 17 and has valve means 24a for controlling the feed of ferrous sulphate solution or crystals from the hopper 19 into the ozonating tank 17. The reservoir 20, like the hopper 19, is preferably located above the ozonating tank 17. It is adapted to contain a column or body of acid and is connected to the ozonating tank 17 by a pipe 25 having a control valve 26 therein. When the valve 26 is opened the acid in the reservoir 20 flows by gravity or is otherwise led into the interior of the ozonating tank 17. In preparing the coagulating and flocculating medium, sludge recovered from the first settling basin 10 is led in wet form into the ozonating tank 17 and acid from the reservoir 20 and ferrous sulphate (in dry form or in solution) from the hopper 19 are fed into the ozonating tank 17. The ferrous sulphate, if in dry form, dissolves in the wet sludge. The amount of ferrous sulphate ordinarily required for the production of an effective coagulating and flocculating medium will fall within a range of 200 to 1000 pounds per million gallons of sewage to be treated. The amount of acid will vary with the character of the sewage but will ordinarily fall within a range of 50 to 100 pounds of concentrated sulphuric acid (or its equivalent) per million gallons of sewage to be treated. This aggregate of materials so fed into the ozonating tank 17, consisting of a combination of wet recovered sludge and acidified ferrous sulphate, is treated with ozonous and electrified air in the ozonating tank 17 for a period of several hours, i. e., until it is saturated to the greatest practicable extent with ozone. The materials so described, when so treated, form the coagulating and flocculating medium that is used in the method or process.

In the alternative, the coagulating and flocculating medium used in the process may consist of a solution of ozonated acidified ferrous sulphate without the addition of recovered sludge. Use of recovered sludge as one of the component parts of the coagulating and flocculating medium effects a measure of economy in the cost of the process by diminishing the amount of ferrous sulphate required, and has the further advantage of decreasing the amount of residual sludge to be disposed of, since ozonation of the sludge as a part of the coagulating and flocculating medium oxidizes a portion of the sludge to extinction. Moreover, the ozonation, as pointed out elsewhere herein, is a definite aid in disposing of the residual sludge, by incineration, as it renders the sludge more readily combustible than otherwise. The process may, however, be effectively and economically used when the coagulating and flocculating medium is made up solely of an ozonated solution of acidified ferrous sulphate without the addition of sludge as a constituent element, and the description herein is intended to cover the process in such alternative form also. When the process is so applied, the procedure and mechanical apparatus are essentially the same as are herein described, the difference being that the sludge recovered from the first settling basin is lead away directly for disposal in its entirety, none of it entering the ozonating tank 17. In such case the sludge that is removed from the first settling basin, instead of being introduced into the ozonating tank 17, is led into a second ozonating tank (not shown) which is like the ozonating tank 17 and functions in the same manner. By ozonating the sludge which is not used to form a component part of the coagulating and flocculating medium a portion of the sludge is consumed by oxidation and the balance, when dried, may be readily burned because of its high oxygen content. Conversely, the process after being initiated with a coagulating and flocculating medium made up of an ozonated combination of acidified ferrous sulphate and recovered sludge, may under some conditions be carried on thereafter by the use of ozonated sludge alone as a coagulating and flocculating medium, without further addition of ferrous sulphate and the process as hereinafter described is intended to cover that procedure likewise. When the process is being carried on in that alternative manner, the mechanical apparatus here shown is suitable for such operation, and the steps in the operation are the same except for the omission to add in the ozonating tank 17 any additional acidified ferrous sulphate when recovered sludge is being ozonated therein for later use as the coagulating and flocculating medium.

The ozone generator 21 is conveniently located with respect to the ozonating tank 17 and is preferably the same in design and construction as that forming the subject matter of Patent No. 2,345,798, granted to me on April 4, 1944. It is to be understood, however, that any conventional or standard pressure type ozonator may be employed. The generator 21 has associated with it a compressor 27 which serves to supply it with air under pressure for conversion into ozonous and electrified air. A pipe 28 receives the ozonous and electrified air that is produced in the generator 21 and serves when the generator is in operation to supply such air to diffusers 29 in the bottom portion of the ozonating tank 17. The diffusers are formed of porous stone or pipe sections which have minute discharge apertures therein and are formed of any suitable material that is not subject to oxidation by the ozonous and electrified air. The capacity of the compressor 27 is such that the ozonous and electrified air emanating from the generator 21 via the pipe 28 is under sufficient pressure to overcome the weight of the combined materials in the ozonating tank 17 and also the resistance incident to the diffusing action of the diffusers 29. When the ozone generator is in operation the ozonous and electrified air flows upwards through the wet combined materials in the ozonating tank 17 in the form of small bubbles and reacts both with the ferrous sulphate component and with the recovered sludge component. In practice it has been found that in the reaction of the ozonous and electrified air with said components best results are obtained when the material is acidified, and it is for this reason that the unit 8 includes the reservoir 20 for introducing an acid, such as sulphuric acid, into the materials in the ozonating tank 17. Whereas sulphuric acid is preferably utilized to acidify the material in the mixing tank, it is to be understood that any other suitabe acid, organic or inorganic, or any acid salt may be employed. In practice, it has been found that desirable results are obtained when the hydrogen ion concentration of the materials in the ozonating tank is adjusted to and maintained at a pH of four to five.

As an alternative procedure, it may sometimes be desirable, as in case of intermittent operation, or of curtailment of power supply, or for other reasons, to ozonate the acidified ferrous sulphate, in solution, separately from the sludge, and then to mix it with the separately ozonated sludge to form the coagulating and flocculating medium that is used in the process. In such case the ozonous and electrified air may be introduced into the ozonating tank either during or after dissolution of the ferrous sulphate in the solution. As soon as the ozonous and electrified air is introduced into the ferrous sulphate solution by way of the diffusers 29 the solution foams violently. This is attributable to the reaction that occurs between the ozonous and electrified air and the ferrous sulphate solution. As soon as the reaction of such air with the ferrous sulphate is complete, i. e., as soon as the solution is completely saturated with the ozonous and electrified air, the foam subsides. By noting when the foam subsides the operator of the apparatus is visually apprised of the fact that preparation of the batch of ozonated ferrous sulphate solution is complete. It is contemplated that as soon as the operator notes discontinuance of foaming of the solution in the tank the operation of the ozone generator will be stopped so as to eliminate waste of ozonous and electrified air. It is to be understood that this phenomenon does not occur when, as will ordinarily be the case, the ozone is applied to the acidified ferrous sulphate and the sludge in combination. If the alternative procedure is employed or used the acidified ferrous sulphate solution, after being ozonated to the fullest or desired extent, is fed or introduced into the storage tank 22. Thereafter a batch of removed or recovered sludge is introduced into the ozonating tank 17 by opening the valve 23 and operating the pump 18a in the pipe 18. After ozonation in the tanks 17 the batch is fed or introduced into the storage tank 22 where it mixes with the previously made ozonated and acidified ferrous sulphate solution. The alternative procedure, as herein indicated is capable of being carried out in the apparatus herein shown and described.

The storage tank 22 is located beneath or adjacent the ozonating tank 17 and receives the coagulating and flocculating medium therefrom by way of a pipe 30 having a control valve 31 therein. The storage tank 22 is so designed that the heavier part of the sludge component of the coagulating and flocculating medium so received settles in the bottom of the tank, from which it is periodically removed by way of a valve controlled drain pipe 22a, without disturbance of the balance of the contents of the tank. The heavy sludge so removed will have been previously ozonated in the ozonating tank to such extent as to render it sterile and inoffensive, and harmless to plant or aquatic life, so that it may, if desired, be disposed of by dumping in any watercourse without rendering the water offensive or impairing its usefulness. Alternatively, it may be readily disposed of by drying and incineration, as it has been found that such ozonated sludge is combustible to much greater degree than sludge which has not been so treated. Withdrawal from the storage tank 22 of the heavier sludge, as described, leaves in the tank combined or intermixed materials made up of the lighter remaining ozonated sludge and the ozonated and acidified ferrous sulphate solution, which combined materials constitute the coagulating and flocculating medium. In practical operation, the amount of settled sludge which is withdrawn from the storage tank 22 for disposal is a minor part of the total quantity of sludge which is in circulation in the process, the sludge being kept in circulation to the greatest extent feasible in order to facilitate the rapid formation of a floc in the first flocculator 9. The quantity of sludge so withdrawn is substantially less than the quantity received when the influent raw sewage, a part of the recovered sludge being ozonated to extinction in the ozonating tank 17. The pipe 16 leads from the storage tank 22 to the mixing chamber 7 and includes a motor driven pump 32. The latter when operated serves to supply the coagulating and flocculating medium from the storage tank into the mixing chamber 7. The pump 32 is driven so that the coagulating and flocculating medium is introduced into the mixing chamber in a steady stream and at a rate that is determined by measurement based on records of the character of the sewage to be treated.

The first flocculator is associated with, and, in effect, forms a part of, the first settling basin 10. It is in the form of a horizontally elongated channel type unit and comprises an outer side wall 33, an inner side wall 34, a bottom wall 35, a pair of end walls 36 and 37, a series of baffles 38 and a series of coacting baffles 39. As shown in the drawing the baffles 28 are arranged in alternate relation with the baffles 39 and are laterally offset with respect to the latter. Alternatively, other means than baffles may be used for the agitation of the contained sewage. The outer and inner side walls 33 and 34, the bottom wall 35 and the end walls 36 and 37 form a horizontally elongated channel 40 through which the sewage is adapted slowly to flow. The sewage, after having the coagulating and flocculating medium mixed with it in the mixing chamber 7, flows into the receiving end of the channel 40 by way of a duct 41 which extends between, and is connected to, the mixing chamber and the end wall 36 of the first flocculator 9. As hereinafter described, the sewage, after flowing through the channel 40, flows into the first settling basin 10 by way of a discharge opening 42 which is formed in the end of the inner side wall 34 that is adjacent the end wall 37. The baffles, as shown in the drawing, cause the sewage with the coagulating and flocculating medium therein to flow in a tortuous or serpentine course through the channel 40 in the first flocculator 9. During flow of the sewage through the first flocculator the coagulating and flocculating medium effect coagulation and flocculation of the suspended particles in the sewage. This coagulating and flocculating medium, because of its impregnation with ozone, also effects an oxidation of the sewage with resulting reduction in its biochemical oxygen demand. During flow of the sewage through the first flocculator there is a definite formation of a floc structure. The sewage as it flows through the channel 40 is slightly agitated by the baffles or other means with the result that there is a marked or pronounced tendency of the floc structure to develop or grow in size. Preferably the first flocculator is of such length that it takes the sewage from between 15 to 30 minutes to flow therethrough. If desired, mechanical means other than the baffles 38 and 39 may be utilized in the first flocculator 9 to effect slow agitation of the sewage for the purpose of developing or building up the floc structure resulting from contact of the coagulating and flocculating medium with the organic and inorganic suspended particles in the sewage.

The first settling basin 10 is positioned in side by side relation with the first flocculator 9 and is horizontally elongated as shown in Figure 1. It comprises a side wall 43, and a pair of end walls 44 and 45 and a downwardly tapered hopper-like bottom wall 46. The inner side wall 34 of the first flocculator forms the other side wall of the first settling basin 10. The end wall 44 adjoins and forms a continuation of the end wall 37 of the first flocculator. The discharge opening 42 is disposed adjacent the end wall 44 with the result that the sewage after flowing through the first flocculator enters the first settling basin at a point adjacent the end wall 44. From the latter end wall the sewage flows slowly through the settling basin 10 toward the end wall 45. The edge of said end wall 45 is disposed at such a level that it forms a weir whereby the sewage after it flows through the first settling basin spills into a discharge channel 47. The latter is connected to, and located outwards of, the upper portion of the end wall 45. As the sewage flows through the first settling basin 10, the floc structure settles to the bottom of the basin in the form of sludge. The sludge gravitates to the apex portion of the bottom wall 46 of the first settling basin and is discharged into the ozonating tank 17 via the valve controlled and pump-equipped pipe 18, to become a component of the coagulating and flocculating medium. If desired, a valve controlled branch pipe 48 may be connected to the pipe 18 in order to permit the first settling basin 10 to be drained for cleaning purposes or to discharge the sludge, or any part thereof when it is desired to operate the apparatus either with the sludge as the flocculating medium or with only a part of the sludge as such component. Preferably the first settling basin 10 is of such capacity as to cause a retention period for the sewage of from 1½ hours to 3 hours. In practice it has been found that in such time substantially all the flocculated substance or sludge settles to the bottom of the basin. When the sewage, after traversing the first settling basin 10, enters the discharge channel 47 it is free from or rid of substantially all suspended particles therein and is practically colorless. As shown in the drawing, the bottom wall 35 of the first flocculator 9 is downwardly inclined and forms a continuation of the adjacent side portion of the bottom wall 46 of the first settling basin 10. The lower portion of the inner side wall 34 of the first flocculator is spaced from the adjacent portion of the bottom wall 35 and embodies an extension 49 which is downwardly inclined in conformity with, and is spaced from, the adjacent portion of the bottom wall 46 of the first settling basin and defines with such portion a downwardly and inwardly inclined channel 50 which leads from the bottom of the first flocculator 9 to the apex portion of the bottom wall 46 of the first settling basin, and permits the sludge or floc structure that settles to the bottom of the first flocculator 9 to gravitate to the apex portion of the bottom wall 48 of the first settling basin from which it may be removed as above described. It is contemplated that other appropriate means may be utilized for discharging into the first settling basin any sludge which settles at the bottom of the first flocculator. Although the channel 50 effects communication between the first flocculator 9 and the first settling basin 10 substantially all of the sewage with the coagulating and flocculating medium therein flows through the first flocculator 9 and enters the first settling basin 10 via the discharge opening 42 which, as heretofore pointed out, is located adjacent the end wall 44 of the first settling basin.

The ozonating tower 11 is located outwards and extends lengthwise of the side wall 43 of the first settling basin 10. It is comparatively narrow as shown in the drawing, and comprises a pair of laterally spaced side walls 51, a pair of end walls 52 and 53 and a bottom wall 54. The discharge end of the channel 47 leads to, and communicates with, the ozonating tower 11 at a point adjacent the end wall 52, with the result that the effluent from the first settling basin flows longitudinally through the ozonating tower from the end wall 52 to the end wall 53; or it may be led otherwise through the tower to promote effective ozonation. At a point adjacent the end wall 53 the ozonating tower 11 is provided with a discharge duct 55 which leads from the tower to the receiving end of the second flocculator 12. In addition to the parts heretofore mentioned the ozonating tower 11 contains a horizontal series of laterally spaced diffusers 56. These diffusers are located directly over the bottom wall 54 of the ozonating tower. They are like or similar to the diffusers 29 in the ozonating tank 17 of the unit 8 and are connected to a header type pipe 57 which extends lengthwise over the outer bottom wall 55 and is connected by a pipe 58 to receive ozonous and electrified air from the ozone generator 21. When the apparatus is in operation the portion of the ozonous and electrified air that is supplied to the header type pipe 57 flows from such pipe into the diffusers 56 and is caused to enter the sewage in the ozonating tower in the form of small or minute bubbles. The latter flow upwards through the sewage in the tower and serve to purify and deodorize the sewage. They also serve to reactivate by oxidation any residual or spent coagulating and flocculating medium to the point where the medium tends to coagulate, flocculate and precipitate any residual particles in suspension in the sewage. The sewage as it enters the ozonating tower from the channel 47 is practically colorless, as previously pointed out. However, as it flows through the tower and is contacted by the bubbles of ozonous and electrified air it becomes cloudy. The cloudiness of the sewage in the ozonating tower is attributable to the fact that the residual coagulant in the sewage is reactivated by the ozonous and electrified air and hence effects coagulation, flocculation and precipitation of any residual suspended organic or inorganic particles or substances in the sewage. The size, capacity and shape of the ozonating tower 11 are preferably such that the sewage flows through, and is subject to contact with, the ozonous and electrified air in the tower for a period of between 3 to 10 minutes.

The second flocculator 12 is located adjacent to and extends lengthwise of the side wall of the ozonating tower 11 that is farther from the first settling basin 10 and is the same in design and construction as the first flocculator 9. It functions in the same manner as the first flocculator. As its component parts the second flocculator 12 comprises laterally spaced outer and inner side walls 59 and 60, end walls 61 and 62, a bottom wall 63, a series of baffles 64 and a series of coacting baffles 65. The side, end and bottom walls of the second flocculator 12 define a horizontally elongated channel 66 through which the sewage flows after passing through the ozonating tower 11. The discharge duct 55 which leads from the discharge end of the ozonating tower 11 is connected to the outer side wall 59 of the second flocculator and discharges into the inlet or receiving end of such flocculator. During flow through the second flocculator of the ozonated or reactivated coagulating and flocculating medium in the sewage it coagulates and flocculates whatever residual particles are in suspension in the sewage. The size, capacity and shape of the second flocculator are such that it takes the sewage approximately between 15 to 30 minutes to flow therethrough. The discharge end of the second flocculator embodies an outlet opening 67 and this is formed in the inner side wall 60.

The second settling basin 13 is similar to, and functions in the same manner as, the first settling basin 10. It comprises a side wall 68, a pair of end walls 69 and 70 and a downwardly tapered hopper-like bottom wall 71. The discharge opening 67 at the discharge end of the second flocculator 12 communicates with the second settling basin 13 at a point adjacent the end wall 69 as shown in Figure 1 of the drawing. During flow of the sewage through the settling basin the coagulated and flocculated substances settle onto the apex portions of the bottom wall 71. The marginal portion of the end wall 70 of the second settling basin is disposed at a lower level than the upper portion of the end wall 69 and forms a weir over which the sewage spills into an effluent channel 72. Such channel is connected to, and extends lengthwise of, the upper marginal portion of the side wall 70 of the second settling basin. The apex portion of the bottom wall 71 is provided with a depending valve controlled duct 73 or other suitable means whereby the sludge that accumulates on the said bottom wall may be discharged. As shown in the drawings, the bottom wall 63 of the second flocculator 12 is downwardly and inwardly inclined and forms a continuation of the adjacent portion of the bottom wall 71 of the second settling basin, and the bottom marginal portion of the inner side wall 60 of the second flocculator is provided with an extension 74 which defines with the adjacent portion of the bottom wall of the second settling basin a channel 75 whereby all coagulated and flocculated substances that tend to settle toward the bottom of the second flocculator are permitted to gravitate into the apex portion of the bottom wall of the second settling basin. Other appropriate means may be utilized for discharging into the second settling basin any sludge which settles at the bottom of the second flocculator.

The effluent duct 14 is connected to, and leads from, the central portion of the effluent channel 72 and serves to discharge the treated, clarified and purified sewage to any desired point. The sewage, upon entry into the effluent channel 72, is clarified to the appearance of drinking water and due to treatment in the apparatus is odorless and entirely inoffensive.

The sludge which is discharged from the second settling basin may, if desired, be led back into the influent raw sewage by way of a valve controlled pump equipped pipe 76. Such sludge becomes a part of the sludge that is ultimately recovered from the first settling basin. As shown in the drawing the pipe 76 leads to the mixing chamber 7.

The operation of the apparatus is as follows:
The sewage to be treated flows successively through the influent duct 5, the unit 6, the mixing chamber 7, the first flocculator 9, the first settling basin 10, the ozonating tower 11, the second flocculator 12, the second settling basin 13 and the effluent duct 14. During flow of the sewage through the mixing chamber 7 it is intimately mixed with the coagulating and flocculating medium which is produced by the unit 8 and is in the form of an acidified ferrous sulphate solution, (alone or in combination with recovered sludge), that is activated by way of ozonous and electrified air. During flow of the sewage through the first flocculator 9 the coagulating and flocculating medium coagulates and flocculates the suspended particles in the sewage. Because of the fact that the sewage is subjected to slow or non-violent agitation in the first flocculator there is a pronounced tendency for the floc structure to increase in size. As the sewage flows through the first settling basin 10 the coagulated and flocculated substances precipitate and gravitate to the bottom of the basin in the form of sludge. During flow or passage of the sewage through the ozonating tower 11 the residual coagulating and flocculating medium is reactivated by the ozone and ozonous air which flows upwards in bubble form through the sewage by the diffusers 56. During flow of the sewage through the second flocculator the reactivated coagulating and flocculating medium serves to coagulate and flocculate any residual particles in suspension and these precipitate and gravitate to the bottom of the second settling basin during passage of the sewage through such basin. In starting the apparatus there is, of course, no sludge available for admixture with the acidified ferrous sulphate solution in the ozonating tank 17 and, therefore, during the early stages of operation of the apparatus, the coagulating and flocculating medium consists only of ozonated and acidified ferrous sulphate solution. After the apparatus is in operation a sufficent period of time for sludge to collect in the bottom of the first settling basin 10 such sludge is introduced via the valve controlled pump equipped pipe 18 into the ozonating tank 17 where it is ozonated for purposes of becoming a component of the coagulating and flocculating medium. The sludge is preferably utilized as a component of such medium because it has great affinity for the ozonous and electrified air, and combined with the ozonated and acidified ferrous sulphate solution produces a medium well capable of producing coagulation and flocculation of the particles in suspension in the raw sewage, and reduces materially the amount of ozonated and acidified ferrous sulphate solution. As stated heretofore, the method will, however, function to produce satisfactory results regardless of whether the coagulating and flocculating medium includes as a component the ozonated and acidified sludge.

The herein described apparatus and method effectively and efficiently fulfill their intended purpose and serve or operate to effect at a comparatively low cost treatment, clarification and purification of a polluted liquid with particles suspended therein. In practice it has been found that when the present apparatus and method are used in connection with the treatment of sewage the percentage of reduction in the biochemical oxygen demand (B. O. D.) of the sewage is as high as can be obtained under the best conditions by heretofore employed apparatus and methods.

Whereas the apparatus and method have been described in connection with the treatment of sewage it is to be understood that they may be effectively utilized in connection with the treatment of any other liquid having particles suspended therein, not only for purification of the liquid but also for recovery of such suspended matter for realization of the commercial value thereof. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An apparatus for treating liquid with particles suspended therein, comprising means forming a chamber adapted to have the liquid to be treated flow therethrough, means for introducing into the chamber for admixture with the liquid therein a preformed liquid medium in the form of an ozonated coagulating and flocculating metallic salt solution, in order to effect coagulation and flocculation of the particles suspended in the liquid, a settling basin of comparatively large capacity arranged and adapted to receive the liquid after flow thereof through the chamber and to have it flow so slowly therethrough that substantially the majority of the coagulated and flocculated particles settles out, a tower connected to receive the liquid from the settling basin and to have the liquid flow therethrough, means in the lower portion of the tower for introducing into the liquid therein numerous minute bubbles of ozonous and electrified air in order to reactivate the residual metallic salt component of the medium and cause it to coagulate and flocculate the residual suspended particles in the liquid, and means for removing from the liquid after passage thereof through the tower the coagulated and flocculated residual particles suspended therein.

2. An apparatus for treating liquid with particles suspended therein, comprising means forming a chamber adapted to have the liquid to be treated flow therethrough, means for introducing into the chamber for admixture with the liquid therein a preformed liquid medium in the form of an ozonated coagulating and flocculating metallic salt solution, in order to effect coagulation and flocculation of the particles suspended in the liquid, a settling basin of comparatively large capacity arranged and adapted to receive the liquid after flow thereof through the chamber and to have it flow so slowly therethrough that substantially the majority of the coagulated and flocculated particles settles out and forms sludge, a tower connected to receive the liquid from the settling basin and to have the liquid flow therethrough, means in the lower portion of the tower for introducing into the liquid therein numerous minute bubbles of ozonous and electrified air in order to reactivate the residual metallic salt component of the medium and cause it to coagulate and flocculate the residual suspended particles in the liquid, means for removing from the liquid after passage thereof through the tower the coagulated and flocculated residual particles suspended therein, and means for removing the sludge from the settling basin and mixing it with the liquid medium prior to introduction of the latter into said chamber.

3. An apparatus for treating liquid with particles suspended therein, comprising means forming a chamber adapted to have the liquid to be treated flow therethrough, means for introducing into the chamber for admixture with the liquid therein a liquid medium in the form of an ozonated coagulating and flocculating metallic salt solution, in order to effect coagulation and flocculation of the particles suspended in the liquid, a settling basin of comparatively large capacity arranged and adapted to receive the liquid after flow thereof through the chamber and to have it flow so slowly therethrough that substantially the majority of the coagulated and flocculated particles settles out and forms sludge, a tower connected to receive the liquid from the settling basin and to have the liquid flow therethrough, means in the lower portion of the tower for introducing into the liquid therein numerous minute bubbles of ozonous and electrified air in order to reactivate the metallic salt component of the liquid medium and cause it to coagulate and flocculate the residual suspended particles in the liquid, means for removing from the liquid after passage thereof through the tower the coagulated and flocculated residual particles suspended therein, means for removing the sludge from the settling basin, and means for ozonating the removed sludge and mixing it with said liquid medium prior to introduction of the latter into the chamber.

4. An apparatus for treating liquid with particles suspended therein, comprising means forming a chamber adapted to have the liquid to be treated flow therethrough, means for introducing into the chamber for admixture with the liquid therein a liquid medium in the form of an ozonated and acidified ferrous sulphate solution in order to coagulate and flocculate the suspended particles in the liquid, a first settling basin of comparatively large area arranged and adapted to receive the liquid after flow thereof through the chamber and to have it flow so slowly therethrough that substantially the majority of the coagulated and flocculated particles settles out and forms sludge, a tower connected to receive the liquid after passage thereof through the settling basin and to have the liquid flow therethrough, means in the lower portion of the tower for introducing into the liquid in said tower numerous minute bubbles of ozonous and electrified air in order to reactivate the residual ferrous sulphate component of the medium and effect coagulation and flocculation of the residual suspended particles in the liquid, and a second settling basin adapted to receive the liquid after flow thereof through the tower and to have it flow so slowly therethrough that the coagulated and flocculated residual particles settle out.

5. An apparatus for treating liquid with particles suspended therein, comprising means forming a chamber adapted to have the liquid to be treated flow therethrough, means for introducing into the chamber for admixture with the liquid therein a liquid medium in the form of an ozonated and acidified ferrous sulphate solution in order to coagulate and flocculate the suspended particles in the liquid, a first settling basin of comparatively large area arranged and adapted to receive the liquid after flow thereof through the chamber and to have it flow slowly therethrough that substantially the majority of the coagulated and flocculated particles settles out and forms sludge, a tower connected to receive the liquid after passage thereof through the settling basin and to have the liquid flow therethrough, means in the lower portion of the tower for introducing into the liquid in said tower numerous minute bubbles of ozonous and electrified air in order to reactivate the residual ferrous sulphate component of the medium and effect coagulation and flocculation of the residual suspended particles in the liquid, a second settling basin adapted to receive the liquid after flow thereof through the tower and to have it flow so slowly therethrough that the coagulated and flocculated residual particles settle out, and means for removing the sludge from the first settling basin and introducing it into the liquid medium prior to introduction of the latter into the chamber.

6. An apparatus for treating liquid with particles suspended therein, comprising means forming a chamber adapted to have the liquid to be treated flow therethrough, means for introducing into the chamber for admixture with the liquid therein a liquid medium in the form of an ozonated and acidified ferrous sulphate solution in order to coagulate and flocculate the suspended particles in the liquid, a first settling basin of comparatively large area arranged and adapted to receive the liquid after flow thereof through the chamber and to have it flow slowly therethrough that substantially the majority of the coagulated and flocculated particles settles out and forms sludge, a tower connected to receive the liquid after passage thereof through the settling basin and to have the liquid flow therethrough, means in the lower portion of the tower for introducing into the liquid in said tower numerous minute bubbles of ozonous and electrified air in order to reactivate the residual ferrous sulphate component of the medium and effect coagulation and flocculation of the residual suspended particles in the liquid, a second settling basin adapted to receive the liquid after flow thereof through the tower and to have it flow so slowly therethrough that the coagulated and flocculated residual particles settle out, means for removing the sludge from the first settling basin, and means for ozonating the removed sludge and mixing it with said liquid medium prior to introduction of the latter into said chamber.

7. An apparatus for treating liquid with particles suspended therein, comprising means forming a chamber adapted to have the liquid to be treated flow therethrough, means for introducing into the chamber for admixture with the liquid therein a liquid medium in the form of an ozonated and acidified ferrous sulphate solution in order to coagulate and flocculate the suspended particles in the liquid, a first settling basin of comparatively large area arranged and adapted to receive the liquid after flow thereof through the chamber and to have it flow slowly therethrough that substantially the majority of the coagulated and flocculated particles settles out and forms sludge, a tower connected to receive the liquid after passage thereof through the settling basin and to have the liquid flow therethrough, means in the lower portion of the tower for introducing into the liquid in said tower numerous minute bubbles of ozonous and electrified air in order to reactivate the residual ferrous sulphate component of the medium and effect coagulation and flocculation of the residual suspended particles in the liquid, a second settling basin adapted to receive the liquid after flow thereof through the tower and to have it flow so slowly therethrough that the coagulated and flocculated residual particles settle out, and means for removing the settled out residual particles and introducing them into said chamber.

8. An apparatus for treating liquid with particles suspended therein, comprising a tank provided with means for forming therein a coagulating and flocculating metallic salt solution, and in addition means for introducing into its lower portion minute bubbles of ozonous and electrified air under pressure in order to ozonate the solution and form it into coagulating and flocculating medium, means forming a mixing chamber, means for introducing the liquid to be treated into the chamber, means for delivering said coagulating and flocculating medium from the tank into said chamber for admixture with the liquid in order to effect coagulation and flocculation of the suspended particles in the liquid and form them into sludge, and means for removing the sludge from the liquid.

9. An apparatus for treating liquid with particles suspended therein, comprising a tank provided with means for forming therein a coagulating and flocculating metallic salt solution, and in addition means for introducing into its lower portion minute bubbles of ozonous and electrified air under pressure in order to ozonate the solution and form it into a coagulating and flocculating medium, means forming a mixing chamber, means for introducing the liquid to be treated into the chamber, means for delivering said coagulating and flocculating medium from the tank into said chamber for admixture with the liquid in order to effect coagulation and flocculation of the suspended particles in the liquid and form them into sludge, and means for removing the sludge from the liquid and introducing it into the tank for admixture and ozonation with the solution therein.

10. An apparatus for treating liquid with particles suspended therein, comprising a mixing tank provided with means for forming therein a ferrous sulphate solution, and in addition means for introducing into its lower portion numerous minute bubbles of ozonous and electrified air in order to ozonate the solution and form it into a coagulating and flocculating medium, means forming a chamber adapted to have the liquid to be treated flow therethrough, means for delivering said coagulating and flocculating medium from the tank into the chamber for admixture with the liquid therein in order to effect coagulation and flocculation of the suspended particles in said liquid and form them into sludge, and means for removing the sludge from the liquid after flow of the latter through the chamber and delivering it into the tank for admixture and ozonation with the solution therein.

11. That improvement in treating liquid with particles suspended therein which comprises introducing into a ferrous sulphate solution numerous minute bubbles of ozonous and electrified air under pressure in order to convert the solution into a coagulating and flocculating liquid medium, then introducing said medium into the liquid to be treated in order to effect coagulation and flocculation of the particles therein, and then removing the coagulated and flocculated particles from the liquid.

12. That improvement in treating liquid with particles suspended therein which comprises introducing into an acidified ferrous sulphate solution ozonous and electrified air under pressure for such length of time and in such amount as to obtain substantially complete saturation of the solution with ozone and form an ozonated and acidified coagulating and flocculating medium, then introducing the medium into the liquid to be treated in order to effect coagulation and flocculation of the suspended particles therein, and then removing the coagulated and flocculated particles from the liquid.

13. That improvement in treating liquid with particles suspended therein which comprises subjecting a ferrous sulphate solution to ozonous and electrified air in order to form a coagulating and flocculating medium, introducing the medium into the liquid to be treated in order to effect coagulation and flocculation of the suspended particles therein and cause such particles to form sludge, and removing the sludge from the liquid and introducing it into said medium prior to introduction of the latter into said liquid.

14. That improvement in treating liquid with particles suspended therein which comprises introducing into an acidified ferrous sulphate solution numerous minute bubbles of ozonated and electrified air in order to convert the solution into a coagulating and flocculating medium, introducing the medium into the liquid to be treated in order to effect coagulation and flocculation of the particles therein and cause such particles to form sludge, and removing the sludge and introducing it into the solution while said minute bubbles of ozonous and electrified air are being introduced into it.

JAMES M. DAILY.

REFERENCES CITED

The following references are of record in the file of this patent:

UNITED STATES PATENTS

| Number | Name | Date |
|---|---|---|
| 1,079,569 | Leet | Nov. 25, 1913 |
| 1,222,637 | Landreth | Apr. 17, 1917 |
| 1,441,731 | Mathis | Jan. 9, 1923 |
| 1,658,974 | De La Porte et al. | Feb. 14, 1928 |
| 1,797,879 | Rudolfs | Mar. 24, 1931 |
| 1,837,286 | Appenheim | Dec. 22, 1931 |
| 1,915,240 | Putnam | June 20, 1933 |
| 2,043,458 | Windecker et al. | June 9, 1936 |
| 2,077,498 | Streander | Apr. 20, 1937 |
| 2,101,810 | Fischer | Dec. 7, 1937 |
| 2,128,569 | Velz | Aug. 30, 1938 |
| 2,167,443 | Bevan | July 25, 1939 |
| 2,320,512 | Daily | June 1, 1943 |

FOREIGN PATENTS

| Number | Country | Date |
|---|---|---|
| 550 | Great Britain | of 1900 |